(12) United States Patent
Bühler et al.

(10) Patent No.: US 6,858,808 B1
(45) Date of Patent: Feb. 22, 2005

(54) BALANCE AS CONTROL SYSTEM

(75) Inventors: René Bühler, Dietikon (CH); Rudolf Huber, Dietikon (CH); Werner Lautenschläger, Leutkirch (DE)

(73) Assignee: Precisa Instruments AG, Dietikon (CH)

( * ) Notice: Subject to any disclaimer, the term of this patent is extended or adjusted under 35 U.S.C. 154(b) by 45 days.

(21) Appl. No.: 10/294,729

(22) Filed: Nov. 15, 2002

Related U.S. Application Data

(63) Continuation of application No. PCT/EP01/05741, filed on May 18, 2001.

(30) Foreign Application Priority Data

May 18, 2000 (DE) .......................................... 100 24 522

(51) Int. Cl.⁷ .............................................. G01G 19/00
(52) U.S. Cl. .................................... 177/25.13; 702/173
(58) Field of Search .......................... 702/173; 705/407, 705/414, 415, 416; 177/25.11–28.19

(56) References Cited

U.S. PATENT DOCUMENTS

| | | | |
|---|---|---|---|
| 4,430,716 A | * 2/1984 | Dlugos et al. | ........... 177/25.15 |
| 4,481,587 A | * 11/1984 | Daniels, Jr. | ................. 705/407 |
| 5,119,306 A | * 6/1992 | Metelits et al. | ............. 705/407 |
| 5,487,603 A | * 1/1996 | Hoff et al. | ................... 702/173 |

FOREIGN PATENT DOCUMENTS

GB   2167561 A   5/1986

* cited by examiner

Primary Examiner—Randy W. Gibson
(74) Attorney, Agent, or Firm—Fitzpatrick, Cella, Harper & Scinto

(57) ABSTRACT

In present-day laboratory work, the largest proportion of the time goes on operations at the laboratory balance. A laboratory balance (1) is therefore provided with an interface (19), with which the laboratory balance (1) can communicate with all the other devices customary in a laboratory. By means of the interface (19), command data as well as weighing-specific data can be transferred from the laboratory balance (1) to the other devices. The other devices can further process the weighing-specific data dependent on the command data, for instance. Furthermore, the other devices can transfer data reflecting the work results to the laboratory balance (1) by means of the interface. Furthermore, the other devices can also transfer control commands to the laboratory balance (1), which in the laboratory balance (1), depending on the evaluation of the weighing-specific data, release or block functions in the laboratory balance (1).

13 Claims, 1 Drawing Sheet

BALANCE AS CONTROL SYSTEM

CROSS REFERENCE TO RELATED APPLICATIONS

This is a continuation of copending International Application No. PCT/EP01/05741, filed May 18, 2001, which was published as WO 01/88492 on Nov. 22, 2001 in German but not in English, which is based on German Application No. 100 24 522.6, filed May 18, 2000, and the priorities of which are hereby claimed.

BACKGROUND OF THE INVENTION

1. Field of the Invention

The present invention relates to a laboratory balance with a weighing facility for laboratory samples, possessing in addition a control function for further devices that are typically found in a laboratory. The invention further relates to a method for controlling laboratory devices by means of a laboratory balance, and a computer software product to implement such a method on a laboratory balance.

2. Description of the Related Art

Providing interfaces for laboratory balances with weighing facilities for laboratory samples is known from prior art. However, according to prior art these serve purely for transferring data specific to weighing. For example, the results of weighing data are transferred to a database.

Transfer of calibration data via the interface to the balance is also known; this transfer can also be called weighing-specific.

Starting from this prior art, it is the object of the present invention to develop a laboratory balance in such a way that it can be used as a central element in a laboratory.

SUMMARY OF THE INVENTION

The invention is based on the consideration that in present-day laboratory work, easily the largest proportion of the time, around 60%, goes on activities at the laboratory balance. So to increase efficiency in laboratory activities, the invention provides for development of a laboratory balance such that the user can utilize it as a central user interface in a laboratory, and can steer further activities, especially for selective further processing of weighing-specific data, without having to leave his central workplace at the laboratory balance.

The above object is achieved in the features of the independent claims. The dependent claims develop the central idea of the present invention especially advantageously.

Thus, according to a first aspect of this invention, a laboratory balance is provided, which presents a weighing facility for laboratory samples as is known. The laboratory balance is further provided with an interface, which can transfer weighing-specific data to third devices. By means of the interface, command data for steering other laboratory devices and/or peripheral devices can also be transferred. For this purpose the laboratory balance is provided with a user interface, by means of which a user can trigger the output of the command data via the interface.

The user is thereby given a selection option by means of which he can choose the device to which the weighing-specific data and/or the command data should be transferred.

The laboratory balance can further possess a facility for displaying states of other devices. The corresponding state information can be transferred over the interface to the laboratory balance. The display facility can be a touch screen, for example.

Furthermore, a logging function can be implemented by means of the interface for quality control of the performed weighing operations.

The laboratory balance can be connected to a network via the interface.

According to a further aspect of the invention, a method for controlling laboratory devices is provided, the control being initiated from a laboratory balance which as is known presents a weighing facility for laboratory samples. In one step, commands are input by a user into the laboratory balance through a user interface. The corresponding command data, together with weighing-specific data from current and/or previous weighing operations, is then transferred from the laboratory balance to other devices, the other devices being connected by means of an interface to the laboratory balance.

The command data can be used for further processing of weighing-specific data on the other devices.

The command data can be output dependent on the result of weighing operations.

States of further devices connected over the interface to the laboratory balance can be displayed on the laboratory balance.

By means of a display on the laboratory balance, it is possible to select the device(s) to which the command data and/or the weighing-specific data should be transferred.

According to yet another aspect of this invention, a computer software product is provided for implementation of the above method.

Further features, advantages and properties of the present invention will become clear to the expert from the following detailed description of an embodiment, referencing the single accompanying FIGURE.

BRIEF DESCRIPTION OF THE DRAWING

The single FIGURE is a diagram of a laboratory balance and a block diagram of associated components according to the invention, for use as a central control system in a laboratory.

DETAILED DESCRIPTION OF THE PREFERRED EMBODIMENT

Figure 1:
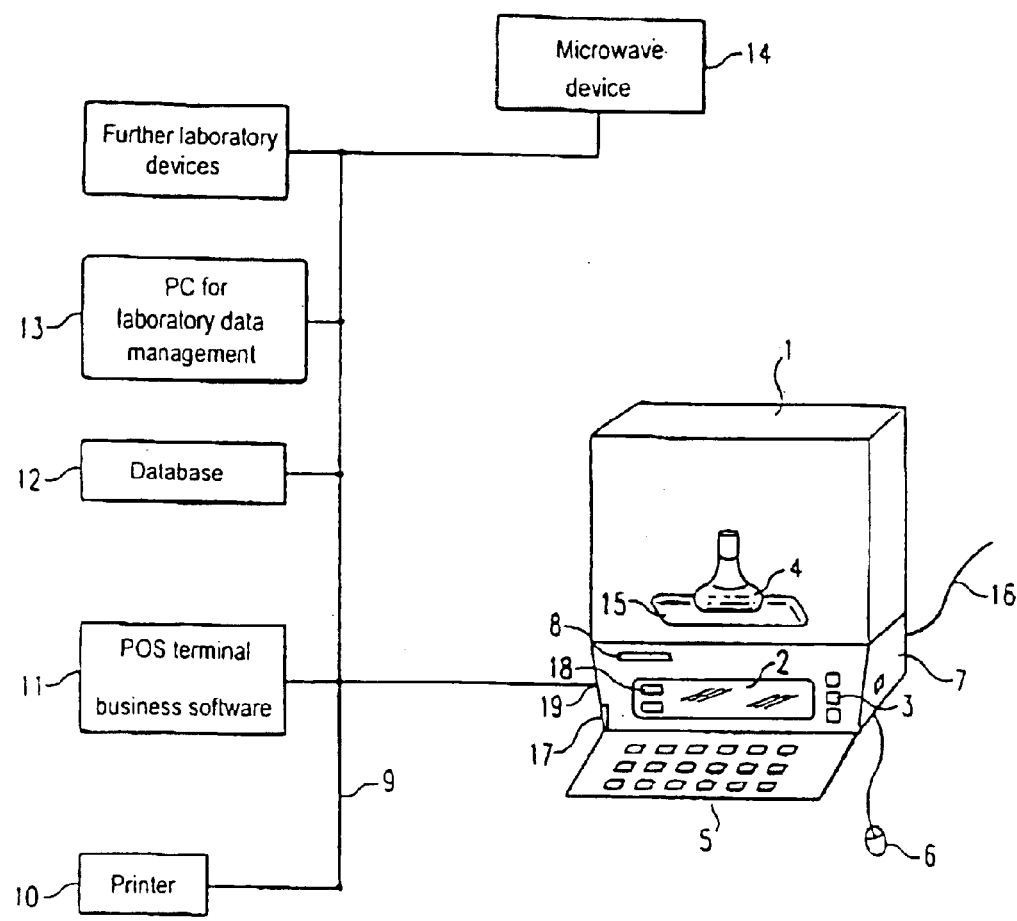

The reference named in the FIGURE denotes a laboratory balance in general, which is provided with a weighing table 15 for weighing laboratory samples 4, which are present in sample containers. The laboratory balance 1 is provided with a processor 7, whose capabilities extend far beyond pure processing of weighing data for a corresponding presentation on a display. The laboratory balance 1 also presents a mains connection 16, and can additionally or alternatively have a battery 17, as is known for example from laptop or notebook computers, allowing a certain mains independence for the operation of the laboratory balance 1.

On the casing of the laboratory balance 1, a display facility such as a touch screen 2 is provided. As is known, such a touch screen 2 presents software-defined control fields 18 in its display surface. In addition, control keys 3 can also be provided outside the display facility (touch screen) 2. Otherwise the laboratory balance 1 can present all the necessary facilities for a user interface, as known from present-day PCs. As an example a keyboard 5, a cursor control device (mouse) 6 and a diskette drive 8 are also shown. Naturally, other drives (CD ROM, etc.) and all storage media customary in a PC (hard disk etc.) can also be provided in the laboratory balance.

By means of an interface 19, the laboratory balance 1 is connected to a network 9. Further devices typical for a laboratory and/or peripheral devices are connected to this network 9. A printer 10 for logging weighing-specific data from the laboratory balance 1 e.g. in accounting and inventory statements, a weighing data database 12, a PC for laboratory data management 13 and a microwave device 14 are shown in the FIGURE as an example.

The equipment shown in the FIGURE for the laboratory balance 1 in the sense of a central user interface in the laboratory, and the connection of all further customary devices via the network 9 and the interface 19 to the laboratory balance 1, thus enables the revaluation of the laboratory balance 1 from a simple tool, as previously known, into the central control unit in the laboratory.

As well as the weighing-specific data that is determined in the course of previous or current weighing operations, command data can also be transferred from the laboratory balance 1 to any of the connected devices via the network 9. The output of the control commands and the choice of device to be addressed can either occur automatically or be selected by the user by means of the display 2 and the various input facilities. In automatic output of weighing-specific data together with command data, the laboratory balance 1 transfers this for example to the business software 11, which processes the weighing-specific data and for example executes an inventory account or POS accounting, based on the weighing-specific data and the command data.

It is obvious that this type of transfer of weighing-specific data together with command data enables a thorough quality control, as it can be logged on the one hand which user executed which activity on which sample at what time. In the event that the quality control, which for example can be executed by the PC 13 for the laboratory data management, shows that there is a fault (for example, a weighing operation occurs too long after a drying operation, so that the sample is already enriched again with moisture), the PC 13 can block further weighing operations on the laboratory balance 1 and make an error display visible to the user on the display 2. Further weighing operations on the laboratory balance 1 are then prevented until the user has corrected the fault, or aborted the entire operation.

It becomes clear from the above that according to the present invention, command data is not only transferred together with weighing-specific data to the other devices, but control data can also be transferred from the other devices to the laboratory balance 1, in order to be displayed there, or also to trigger and/or block certain functions in the laboratory balance 1. Data can thus be further utilized or displayed on the laboratory balance 1, which data reflects the state or results of further processing work on the other devices connected to the network 9. The objective of all this is that the user has to leave his central workplace at the laboratory balance as seldom as possible during the sample preparation and analysis in the day-to-day work of the laboratory.

According to this procedure, weighing-specific data is thus transferred together with command data that specifies which device the weighing-specific data should be transferred to, to a further device connected by means of the network. The further device then processes this weighing-specific data and returns an evaluation result, which can be data and/or control commands, to the laboratory balance. A complete quality control process can thus take place, as the next operation on the laboratory balance 1 can only be executed in each case when the immediately preceding step has been properly executed. This quality control thus runs completely automatically, and requires no intervention at all from a user. The fact that the user cannot intervene also ensures that no manipulation occurs in the quality control and quality assurance.

What is claimed is:

1. A laboratory balance for use in a laboratory having further laboratory devices used in the analysis of laboratory samples, said laboratory balance comprising:

a weighing facility for weighing laboratory samples;

a command data interface connected to said weighing facility to transfer weighting-specific data and command data to at least one of further laboratory devices and peripheral devices for steering same; and a user interface also connected to said weighing facility to allow a user to trigger command data outputs from said command data interface to at least one of further laboratory devices and peripheral devices, said command data interface and said user interface further being connected to transfer data and commands from said at least one of further laboratory devices to said weighing facility.

2. A laboratory balance according to claim 1, further including a display device connected to display a state of at least one of further laboratory devices and peripheral devices when such data is received by said weighing device via said command data interface.

3. A laboratory balance according to claim 1, wherein said user interface is constructed to provide a selection function by means of which a user can choose another laboratory device or peripheral device to receive at least one of said weighing-specific data and command data.

4. A laboratory balance according to claim 1, and further including means connected to said command data interface for quality control logging of weighing operations carried out on said device.

5. A laboratory balance according to claim 1, wherein said laboratory balance is connectable via said command data interface to a network.

6. A laboratory balance according to claim 1, wherein said command data interface is constructed to transfer from other devices to the laboratory balance, control data that triggers or blocks functions in the laboratory balance.

7. A method for controlling laboratory devices and/or other peripheral devices from a laboratory balance which includes a weighing facility for laboratory samples, said method comprising the steps of:

inputting commands via a user interface in the laboratory balance;

transferring, via a command data interface, command data and weighing-specific data from said laboratory balance to at least one of other laboratory devices and peripheral devices; and transferring data and commands via said user interface from said at least one of other laboratory devices and peripheral devices to said weighing facility to control operation of said weighing facility.

8. A method according to claim 7 and further including the step of causing said command data to direct predetermined further processing of weighting-specific data from said laboratory balance.

9. A method according to claim 7 including wherein said weighing-specific data corresponds to the results of a weighing operation.

10. A method according to claim 7, further including the step of
displaying the states of other laboratory devices which are connected to said command data interface.

11. A method according to claim 7, further including the step of
selecting, based on a display of said laboratory balance, a device to which command data or weighing-specific data is transferred.

12. A method according to claim 7, including the step of
transferring control commands, which trigger or block predetermined functions in said laboratory balance, from other devices to said laboratory balance.

13. A machine readable medium which contains a program for controlling a laboratory balance which includes a weighing facility for laboratory samples and a processor, said program being operable to control laboratory devices and/or other peripheral devices from said laboratory balance by the steps of:

inputting commands via a user interface in the laboratory balance;

transferring, via a command data interface, command data and weighing-specific data from said laboratory balance to at least one of other laboratory devices and peripheral devices; and transferring data and commands from said at least one of other laboratory devices and peripheral devices, via said user interface, to control operation of said weighing device.

* * * * *